Figure 1:
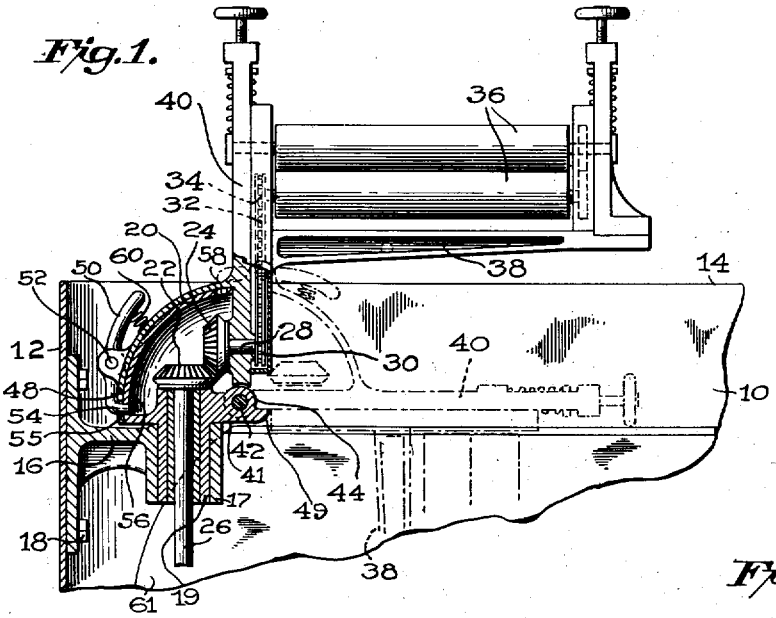

Oct. 18, 1927. H. D. PAYNE ET AL Re. 16,776

WASHING MACHINE WITH FOLDING WRINGER

Original Filed Sept. 7, 1920

WITNESSES:

R. S. Harrison

J. P. Shea

INVENTORS:

Halsey D. Payne,
Alvin W. DeClerque,
Sidney T. Sjoberg.

BY

Wesley G. Carr

ATTORNEY

Reissued Oct. 18, 1927. Re. 16,776

UNITED STATES PATENT OFFICE.

HALSEY D. PAYNE, ALVIN W. DE CLERQUE, AND SIDNEY T. SJOBERG, OF CHICAGO, ILLINOIS, ASSIGNORS, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

WASHING MACHINE WITH FOLDING WRINGER.

Original No. 1,375,170, dated April 19, 1921, Serial No. 408,705, filed September 7, 1920. Application for reissue filed April 20, 1923. Serial No. 633,517.

This invention relates to laundry machines of the type commonly used in homes.

A general object of the invention is to provide a roller mechanism which is movable about a horizontal axis extending transversely thereof.

One object of the invention is to provide a power-driven wringer movable from an elevated to a lowered position within a cabinet.

Another object of the invention is to pivotally dispose a power-driven wringer on a horizontal axis extending transversely of the wringer in order that the wringer may be folded downwardly when not in use.

Another object of the invention is to so equip the cabinet of a power-driven washing machine with a wringer for use in wringing the clothes delivered from the tub that the wringer may be tilted between its normal working position at least partially above the plane of the upper edge of the cabinet to a position where it is at least partially below such plane, and therefore capable of being concealed by a cover which may be placed across the top of the cabinet. It is well known that it is necessary to cover up wringers and other washing machinery between periods of use, in order to keep such devices from getting dirty and deteriorating by mere contact with air.

Another object of the invention is to provide a power-driven wringer which may be moved from elevated to lowered position when not in use and in which the drive mechanism is disconnected when the wringer is lowered.

Another object of the invention is to provide a protective guard for the operating gearing of the mechanism in order that the gearing is housed both when the wringer is in elevated position and when it is in lowered position with the gearing disconnected whereby danger of damage and injury is removed.

A further object of the invention is the provision of a latch for securing the wringer in elevated and lowered positions.

A still further object of the invention is to provide a construction which can be easily and inexpensively made, which is satisfactory in use and is not readily liable to get out of order.

Other objects will appear as the description proceeds.

The invention comprises a wringer pivoted for movement about a horizontal axis extending transversely of the wringer, whereby the wringer may be moved within a cabinet and alongside the tub. In such position the driving connection is broken. Casings are provided for housing the operating parts of the wringer, the nesting relations of the casings permitting expansion thereof on the lowering of the wringer so that the gears are also covered when disconnected. A latch locks the wringer in elevated or lowered position.

Figure 2:
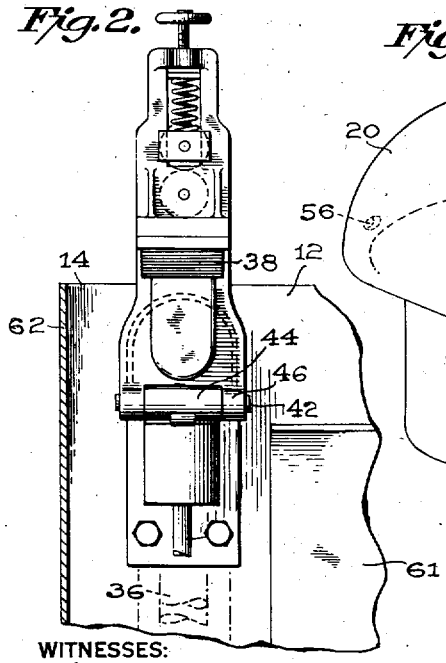

Referring to the drawings in which similar numerals represent the same parts throughout the several views, Figure 1 is a side elevation of mechanism illustrating the invention in its preferred form, parts being shown in section, Fig. 2 is an end view in elevation taken from the right hand side of Fig. 1, showing the wringer in elevated position.

Figure 3:
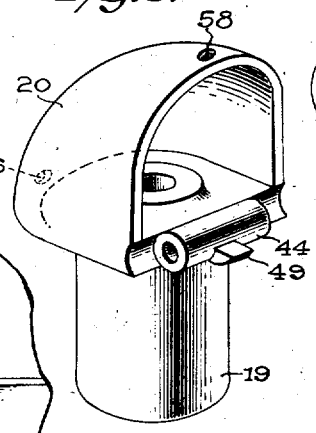
Figure 4:
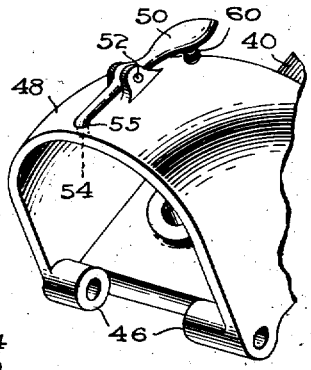

Figs. 3 and 4 are detail views of parts constituting the pivoted joint on which the wringer is mounted so it can swing downwardly from elevated position.

Fig. 1 shows in conventional form the upper portions of side walls 10—12 of a washing cabinet. Adjacent to the upper edge 14 of the cabinet, a bracket 16 carrying a bearing 17 is secured by screws 18.

A member 19 is in the bearing 17 and is rigid with a hollow casing 20 containing intermeshing bevel gears 22 and 24. The bevel gear 22 is power driven through the agency of a vertical shaft 26 connected at its lower ends to the washing machine drive mechanism. The latter mechanism, however, forms no part of this invention and, therefore, is not shown. Gear 24 drives a horizontal shaft 28, which carries a sprocket gear 30, over which passes a chain 32, to drive a sprocket gear 34 mounted on the shaft of the lower of the rollers 36 carried by bracket 38. Bracket 38 is carried by a downwardly extending frame member 40 in which shaft 28 is journaled.

A support 41 projects laterally from member 19 and frame member 40 is pivoted thereon by means of a hinge pin 42 passing through a hinge bearing 44, on the support 41, and hinge bearing 46 on frame member 40.

The lower end of frame member 40 also carries a hollow casing 48 which fits about casing 20, the two casings 20 and 48 being so shaped and arranged that the wringer and attached parts may freely rotate about hinge pin 42 from the full line positions of Figs. 1 and 2, in which the wringer is above the edge 14 of the cabinet, to the dotted line positions of Figs. 1 and 2, where it is below the edge 14 of the cabinet and out of the way so that the cabinet may be covered. It will be noted that the bevel gears 22 and 24 are separated when the wringer is moved from the full line position to the dotted line position and that the wringer drive mechanism is therefor rendered inoperative.

It will also be noted that the wringer swings in the plane of its body, i. e., the plane of its rolls and can move deeply into the cabinet when being moved to an inoperative position. A stop 49 is provided on bearing 44 for limiting the downward movement of the wringer by contact with frame member 40.

A catch lever 50 is pivotally mounted at 52 on the outside of casing 48 for detachably locking the wringer mechanism in elevated and lowered positions. The lever 50 carries a locking tooth 54 adapted to pass through an aperture 55 in the casing 48 and into a selected one of the apertures 56, 58 in the wall of the casing 20. Aperture 56 is used when the wringer is in the elevated or full line position of Fig. 1, and aperture 58 is used when the wringer is in the lowered or dotted line position of Fig. 1. The lever 50 is urged to said locking positions by compression spring 60.

When the wringer is in its lowered position it hangs in a vertical plane alongside the tub 61 and adjacent to the wall 62 of the cabinet. The cabinet is closed up by placing a cover (not shown) over its upper edge. It then possesses a very neat appearance and may be used as a table since the wringer is not in the way. A minimum space is occupied, and all parts are protected from dirt and the action of the air, while the drive mechanism in inoperative whereby danger of accident is eliminated. The nesting casings at all times house the gearing, protecting the drive mechanism and preventing injury to persons by contact with the moving parts. The wringer is conveniently locked in elevated or lowered position and, as its downward movement occurs in the plane in which the rollers lie, but a small space for the wringer is needed between the tub and the cabinet wall.

The present embodiment of the invention may be modified in various ways and a substantial range of equivalents is contemplated within the scope of the appended claims.

We claim as our invention:

1. In mechanism of the class described, a cabinet, a wringer mechanism mounted in a frame, means pivoting the wringer frame at a point inside the cabinet and below its upper edge in such manner that the wringer may be swung in the plane of the body of the wringer from an elevated position where it extends above the top of the cabinet to a lower position where it is below the top of the cabinet, means for selectively locking the wringer in each of said positions, and means in the cabinet adapted to deliver power to the wringer when the wringer is in its elevated position.

2. In mechanism of the class described, a cabinet, a wringer mechanism mounted in a frame, means pivoting the wringer frame at a point inside the cabinet and below its upper edge in such manner that the wringer may be swung in the plane of the body of the wringer from an elevated position where it extends above the top of the cabinet to a lower position where it is below the top of the cabinet, means for selectively locking the wringer in each of said positions, means in the cabinet adapted to deliver power to the wringer when the wringer is in its elevated position, and means automatically disconnected from the wringer as it moves from its elevated to its lowered position.

3. In mechanism of the class described, a cabinet, a vertical power shaft extending upward in the cabinet toward its top, a wringer frame normally extending vertically of the cabinet parallel to said power shaft, means pivoting said wringer frame on an axis at right angles to the power shaft so that the wringer can be swung from said vertical position to a position in which the frame is horizontal and the wringer is below the upper edge of the cabinet, a wringer mechanism carried by the wringer frame, means detachably locking the wringer frame in each of said positions, and means driven by said power shaft for driving the wringer mechanism when the wringer is in its upright position.

4. In mechanism of the class described, a cabinet, a vertical power shaft extending upward in the cabinet toward its top, a wringer frame normally extending vertically of the cabinet parallel to said power shaft, means pivoting said wringer frame on an axis at right angles to the power shaft so that the wringer can be swung from said vertical position to a position in which the frame is horizontal and the wringer is below the upper edge of the cabinet, a wringer mechanism carried by the wringer frame, means detachably locking the wringer frame in each of said positions and means driven by said power shaft for driving the wringer mechanism when the wringer is in its upright position, said power shaft and wringer being automatically disconnected as the wringer moves from its upper to its lower position.

5. A power-driven wringer comprising a vertical drive shaft provided with a bevel gear at the upper end thereof, a bearing support for the shaft, a frame and a wringer carried by said frame pivotally disposed on said support whereby the wringer may be moved from an upper position of use to a lower position of non-use, a second bevel gear supported by the frame and operatively connected with the wringer to operate it and moving with the wringer to engage or disengage the bevel gear on the drive shaft as the wringer is moved to its upper or to its lower position.

In witness whereof, we have hereunto subscribed our names this 17th day of April, 1923.

HALSEY D. PAYNE.
ALVIN W. DE CLERQUE.
SIDNEY T. SJOBERG.